(12) United States Patent
An et al.

(10) Patent No.: US 11,467,333 B1
(45) Date of Patent: Oct. 11, 2022

(54) BACKLIGHT UNIT FOR BLIND SPOT WARNING LIGHTING

(71) Applicants: HYUNDAI MOTOR COMPANY, Seoul (KR); KIA CORPORATION, Seoul (KR)

(72) Inventors: Seon-Yong An, Chuncheon-si (KR); Chan-Hee Kang, Incheon (KR); Kyoung-Chun Kweon, Seoul (KR); Seok-Jun Kim, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/708,887

(22) Filed: Mar. 30, 2022

(30) Foreign Application Priority Data

Nov. 8, 2021 (KR) .................. 10-2021-0152069

(51) Int. Cl.
*F21V 8/00* (2006.01)

(52) U.S. Cl.
CPC ........... *G02B 6/009* (2013.01); *G02B 6/0036* (2013.01); *G02B 6/0073* (2013.01)

(58) Field of Classification Search
CPC ..... G02B 6/009; G02B 6/0036; G02B 6/0073
See application file for complete search history.

(56) References Cited

U.S. PATENT DOCUMENTS

| 8,339,526 B2 | 12/2012 | Minikey, Jr. et al. |
| 9,676,335 B2 | 6/2017 | Kim et al. |
| 10,744,945 B2 | 8/2020 | Oh et al. |
| 2008/0068520 A1 | 3/2008 | Minikey, Jr. et al. |
| 2015/0251603 A1* | 9/2015 | Kim .................. G02B 6/002 362/511 |
| 2019/0135182 A1 | 5/2019 | Oh et al. |
| 2020/0096695 A1 | 3/2020 | Oh et al. |
| 2020/0223365 A1* | 7/2020 | Oh ........................ F21V 7/28 |

FOREIGN PATENT DOCUMENTS

| JP | 2020-529704 A | 10/2020 |
| KR | 10-1011507 B1 | 1/2011 |
| KR | 10-1526792 B1 | 6/2015 |
| KR | 10-1804311 B1 | 12/2017 |
| KR | 10-1873279 B1 | 7/2018 |

\* cited by examiner

*Primary Examiner* — Mary Ellen Bowman
(74) *Attorney, Agent, or Firm* — McDonnell Boehnen Hulbert & Berghoff LLP

(57) ABSTRACT

A backlight unit for blind spot warning lighting includes a printed circuit board (PCB) mounted with a light-emitting diode (LED), a bottom case having the PCB embedded on a lower portion thereof, and having an opened front surface, and a top case comprising a front plate covering a the front surface of the bottom case, and a guide protrusion formed to protrude backward from a rear surface of the front plate to guide the light from the LED to the front plate, and an object of the present disclosure is to provide a backlight unit, which can uniformly emit light while unifying the number of reflection and diffusion layers, and be advantageous for applying a hot wire, thereby improving visibility.

20 Claims, 17 Drawing Sheets

BACKLIGHT UNIT FOR BLIND SPOT WARNING LIGHTING

CROSS REFERENCE TO RELATED APPLICATIONS

This application claims priority to Korean Patent Application No. 10-2021-0152069 filed on Nov. 8, 2021, which is incorporated herein by reference in its entirety.

BACKGROUND

Field of the Disclosure

The present disclosure relates to a backlight unit for an image formed on a side mirror for a vehicle to warn a collision risk of a blind spot.

Description of Related Art

For the convenience of consumers, various collision warning systems for front and block spot are being increasingly applied to a vehicle, and the present disclosure relates to a backlight unit for blink spot warning lighting.

The backlight unit is composed of various reflection and diffusion layers in the form of indirect light in which a light source radiated from the side emits light to the front. At this time, it is a lamp manufactured so that light can emit uniformly, and serves to emit a warning image through an image engraved on a side mirror. The backlight unit uses multi-layered reflection and diffusion materials to emit uniform and bright light to the front. That is, the backlight unit usually has a multi-layer with two or more reflection and diffusion layers for uniformly emitting light formed therein. As the related art, Korean Patent No. 10-1526792 discloses a backlight unit composed of multiple layers such as top/bottom cases, a light source unit, a protection plate, a light guide plate, a prism plate, a reflector, and a diffuser sheet. According to the related art, the role of each layer is not clear, and the multi-layer structure used for implementing uniform brightness (mitigating hot spot) reduces overall brightness as the light passes through several layers. In addition, the multi-layer structure increases the cost and complicates the assembly process.

In addition, due to the structure that cannot be applied because a hot wire is adjacent to the warning image due to the rectangular shape of the backlight unit, there is also a concern of lowering visibility due to lack of dehumidification and snow removal performance in high humidity, freezing environments or rain.

The contents described in Description of Related Art are to help the understanding of the background of the present disclosure, and may include what is not previously known to those skilled in the art to which the present disclosure pertains.

SUMMARY

The present disclosure has been made in efforts to solve the above problem associated to the related art, and an object of the present disclosure is to provide a backlight unit, which can uniformly emit light while unifying the number of reflection and diffusion layers, and be advantageous for applying a hot wire, thereby improving visibility.

A backlight unit for blind spot warning lighting according to one aspect of the present disclosure includes a printed circuit board (PCB) mounted with a light-emitting diode (LED), a bottom case having the PCB embedded on a lower portion thereof, and having an opened front surface, and a top case including a front plate covering the front surface of the bottom case, and a guide protrusion formed to protrude backward from a rear surface of the front plate to guide the light from the LED to the front plate.

The guide protrusion includes a guide part including a first side portion and a second side portion for guiding the light from the LED and a light incident part disposed upward from the LED, in which the light incident part is disposed at a height lower than a height of a lower end of the guide part with respect to a height of the PCB.

Here, the light incident part is formed with a pattern.

In addition, the guide protrusion can further include an inclined part connected from both ends of the light incident part up to both lower ends of the guide part.

In addition, the top case can further include a rear plate having an outer circumferential surface formed along the rear surfaces of the guide part, the light incident part, and the inclined part.

In addition, the backlight unit for blind spot warning lighting can further include an adhesive tape bonded to the front surface of the front plate of the top case, and having some transparent regions on which an image is displayed.

Here, the transparent region of the adhesive tape is disposed on a location higher than the inclined part.

In addition, the backlight unit for blind spot warning lighting can further include a reflector covering the guide protrusion and the rear plate, and inserted between inside surfaces of the top case and the bottom case.

Meanwhile, the front surface of the rear plate is formed with a pattern.

Here, a density of the pattern is different depending upon a distance from the light incident part.

Furthermore, the pattern is denser as the distance from the light incident part increases.

Meanwhile, a distance between upper ends of the first side portion and the second side portion of the guide part is shorter than a distance between lower ends of the first side portion and the second side portion.

In addition, a plurality of LEDs are mounted, and the guide protrusion can include a plurality of light incident parts corresponding to the plurality of LEDs, and the guide protrusion can further include a plurality of inclined parts formed to be inclined upward from both ends of each of the plurality of light incident parts.

Next, a backlight unit for blind spot warning lighting according to another aspect of the present disclosure includes a printed circuit board (PCB) mounted with a light-emitting diode (LED), a bottom case having the PCB embedded on a lower portion thereof, and having an opened front surface, and a top case including a front plate covering the front surface of the bottom case, a guide protrusion formed to protrude backward from a rear surface of the front plate, and a rear plate having an outer circumferential surface formed along the rear surface of the guide protrusion.

In addition, the guide protrusion includes a guide part including a first side portion and a second side portion for guiding the light from the LED and a light incident part disposed upward from the LED, in which the light incident part is disposed at a height lower than a height of a lower end of the guide part with respect to a height of the PCB.

In addition, the guide protrusion can further include an inclined part connected from both ends of the light incident part up to both lower ends of the guide part.

Furthermore, a distance between upper ends of the first side portion and the second side portion of the guide part is shorter than a distance between lower ends of the first side portion and the second side portion.

In addition, the backlight unit for blind spot warning lighting can further include an adhesive tape bonded to the front surface of the front plate of the top case, and having some transparent regions on which an image is displayed.

In addition, the light incident part and the rear plate are formed with patterns.

In addition, the backlight unit for blind spot warning lighting can further include a reflector covering the guide protrusion and the rear plate, and inserted between inside surfaces of the top case and the bottom case.

According to the backlight unit for blind spot warning lighting according to the present disclosure, it is possible to allow the top case to serve as the light guide plate, the prism plate, and the diffusion sheet to integrate multiple layers as before, thereby being advantageous for workability and cost.

Despite such a situation, it is possible to implement the uniform and sufficient light quantity.

In addition, it is possible to improve the dehumidification and snow removal performance by the structure of being advantageous for applying the hot wire, thereby preventing the reduction in visibility.

DETAILED DESCRIPTION

To fully understand the present disclosure, operational advantages of the present disclosure, and the object achieved by the practice of the present disclosure, reference should be made to the accompanying drawings exemplifying a preferred exemplary embodiment of the present disclosure and the contents shown in the accompanying drawings.

In describing the preferred exemplary embodiment of the present disclosure, a description of the known technology or the repetitive description to unnecessarily obscure the gist of the present disclosure will be reduced or omitted.

Figure 1:
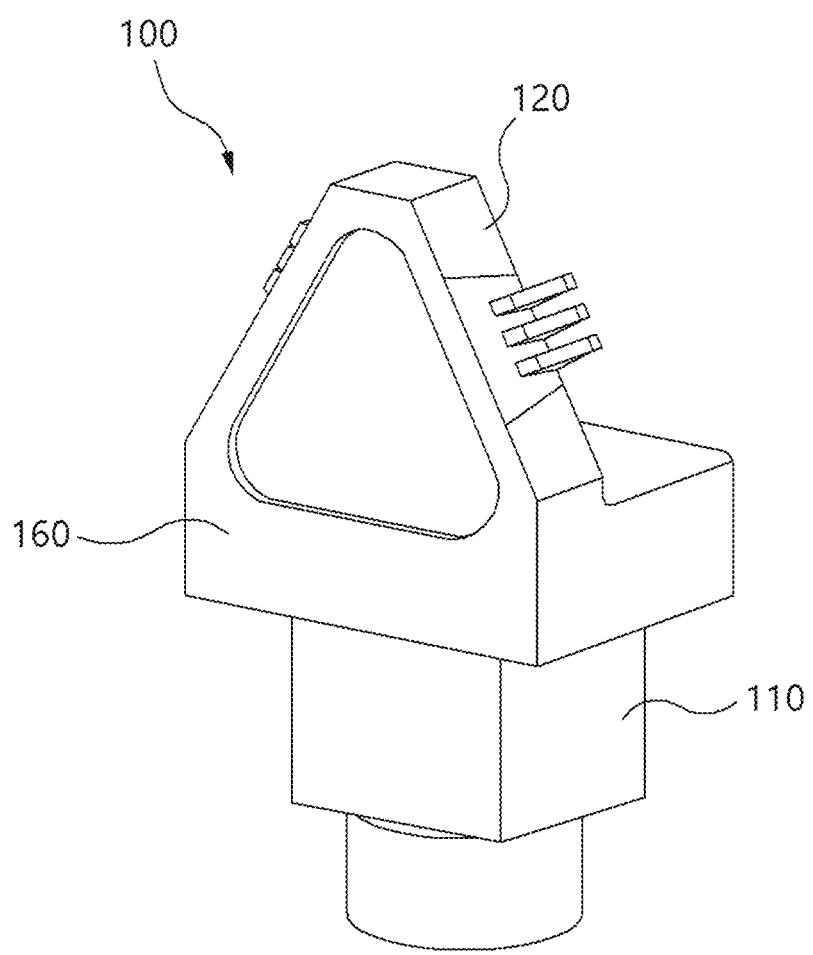
FIG. 1 shows a backlight unit for blind spot warning lighting according to the present disclosure.
Figure 2:
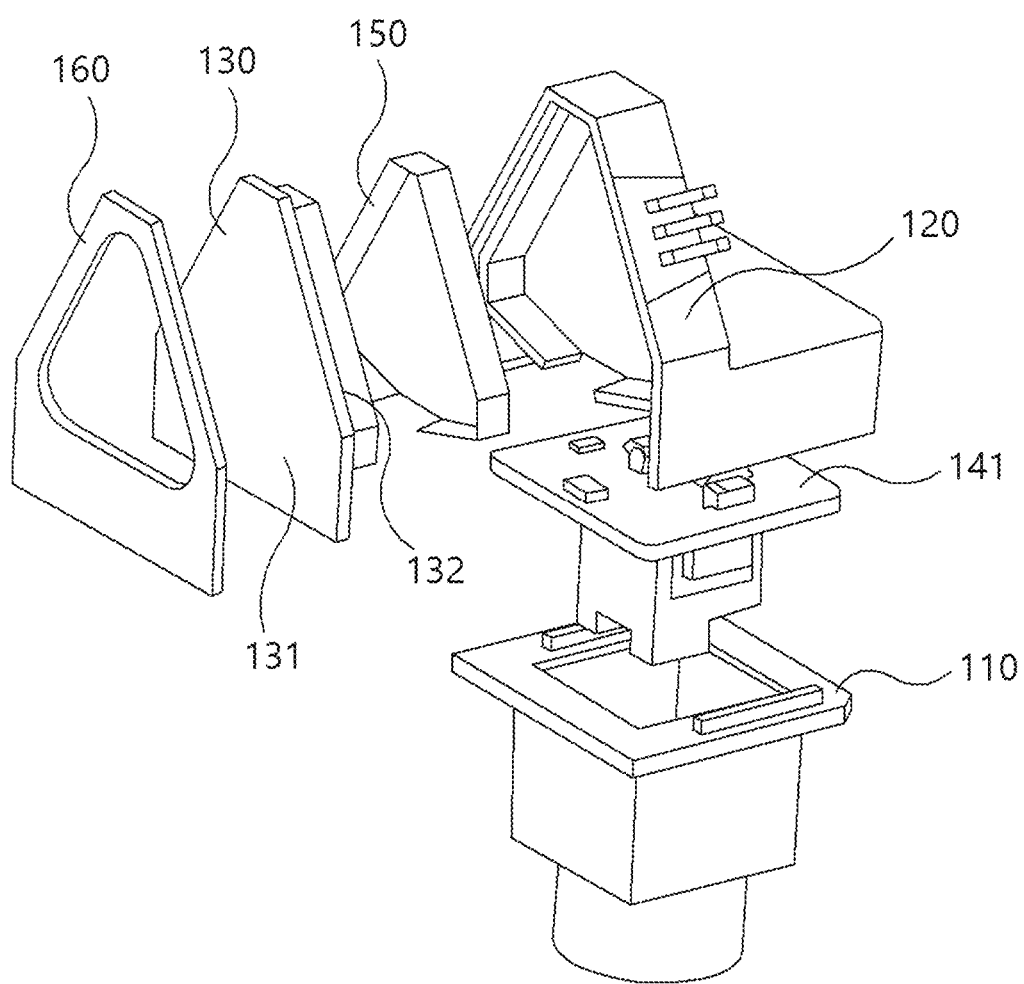
FIG. 2 is an exploded perspective diagram of FIG. 1.

FIG. 1 shows a backlight unit for blind spot warning lighting according to the present disclosure, and FIG. 2 is an exploded perspective diagram of FIG. 1.

Figure 3:
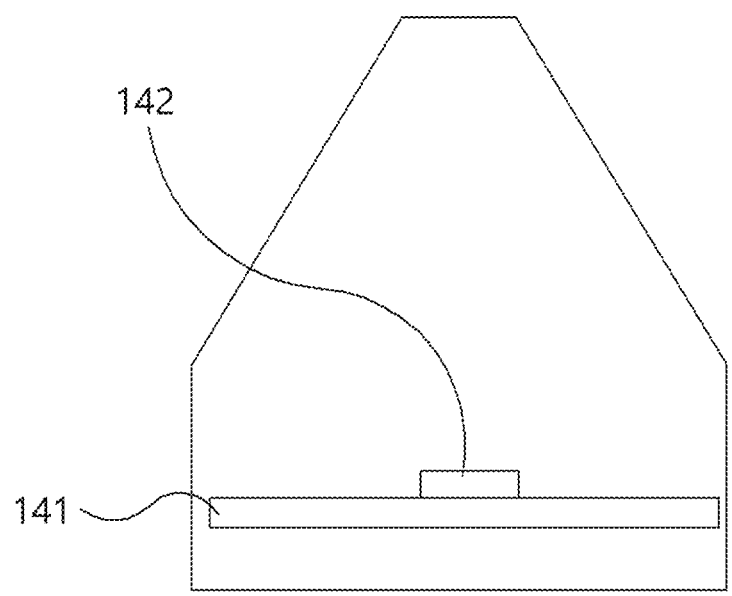
FIG. 3 shows a partial shape of a front surface of the backlight unit for blind spot warning lighting according to the present disclosure.
Figure 4:
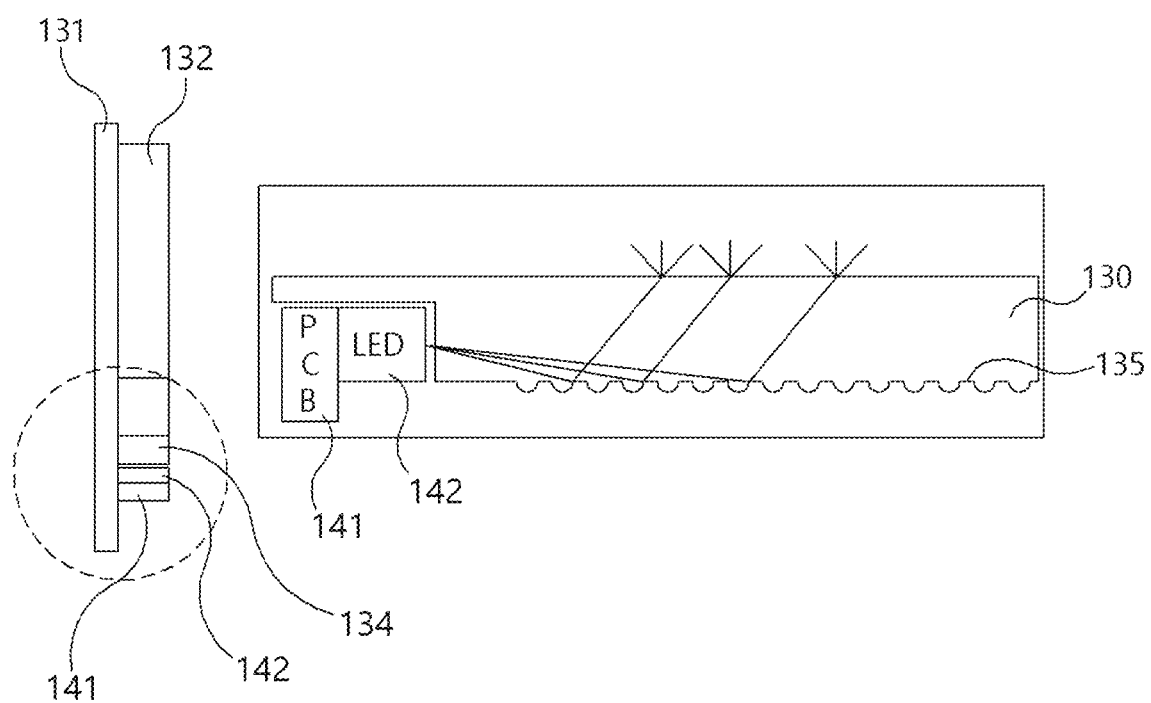
FIG. 4 shows a partial shape of a side surface of the backlight unit for blind spot warning lighting according to the present disclosure.
Figure 5:
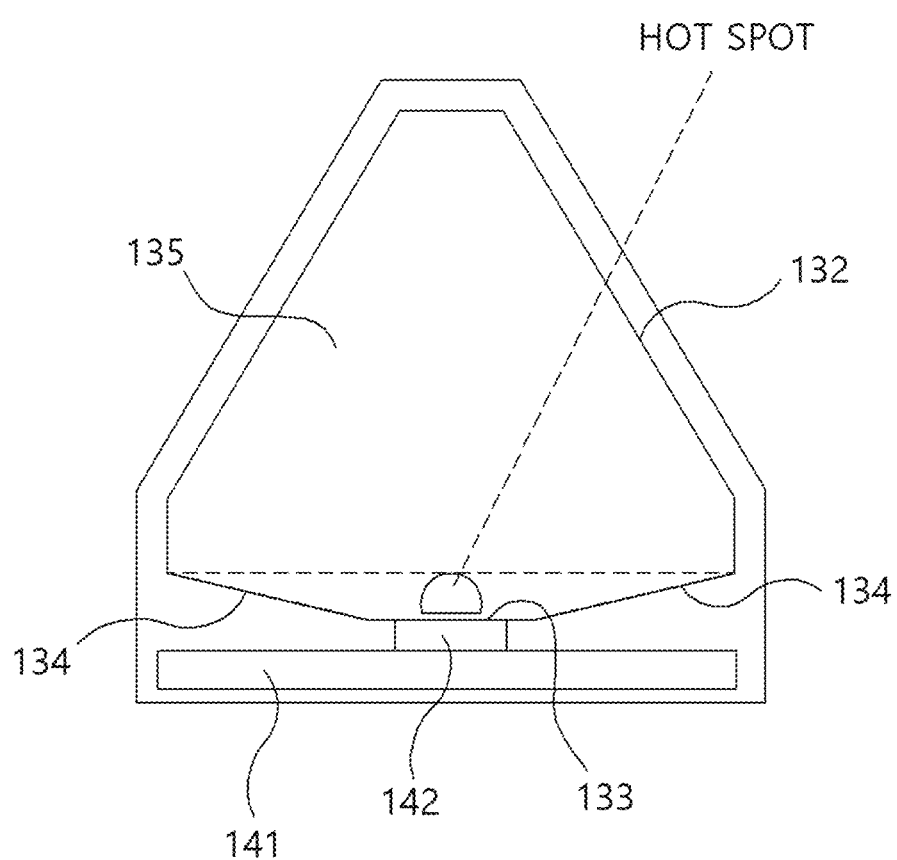
FIG. 5 shows a partial shape of a rear surface of the backlight unit for blind spot warning lighting according to the present disclosure.

FIG. 3 shows a partial shape of a front surface of the backlight unit for blind spot warning lighting according to the present disclosure, FIG. 4 shows a partial shape of a side surface of the backlight unit for blind spot warning lighting according to the present disclosure, and FIG. 5 shows a partial shape of a rear surface of the backlight unit for blind spot warning lighting according to the present disclosure.

Hereinafter, a backlight unit for blind spot warning lighting according to an exemplary embodiment of the present disclosure will be described with reference to FIGS. 1 to 5.

The present disclosure reduces a multi-layer structure for diffusing light from a light source in a backlight unit to a single layer, thereby reducing a light quantity lost while transmitting each layer. In addition, shown is a backlight unit with a single layer but uniform and bright properties by a material of an integral top case 130 and the optimization of an optic structure.

The optimization of the multi-layer structure is formed of a single layer with an integral structure so that the top case 130 serves as a diffuser sheet, a prism plate, a light guide plate as well as the top case.

The backlight unit has been manufactured using the multiple structure made of various materials such as the diffusion sheet, the prism plate, and the light guide plate as the conventional main diffusion material in the backlight unit, and the top case (+ protection plate) for protecting internal parts has also been separately used. This has a structure of causing a large amount of light lost in each layer and causes a problem of increasing the number of processes and the cost.

Specifically, a backlight unit 100 according to the present disclosure is composed of a lower case 110, a bottom case 120, a top case 130, a printed circuit board (PCB) 141, a light-emitting diode (LED) 142, a reflector 150, and an adhesive tape (flon) 160.

The lower case 110 is a component configured to accommodate and support the PCB 141, wires, etc., and the bottom case 120 can be mounted or integrally formed on an upper portion of the lower case 110.

The bottom case 120 has opened front and lower surfaces, and a front rim shape corresponding to a rear surface of the top case 130 to be coupled to the top case 130.

The PCB 141 is horizontally disposed in and inserted into a space through the opened lower surface of the bottom case 120, and the LED 142 is mounted on the PCB 141 as a light source.

The reflector 150 having an opened front surface can be in contact with and inserted into an inside surface of the bottom case 120.

The top case 130 is coupled to cover the front surface of the bottom case 120 for protecting a light-emitting part to serve as a light guide plate so that the light from the LED 142 is emitted forward, and can also serve as the prism plate and the diffusion sheet.

The top case 130 is composed of a front plate 131 of a flat plate, and a guide protrusion vertically protruding backward from the rear surface of the front plate 131, and a rear plate 135 covering a rear end of the guide protrusion, and the guide protrusion is composed of a guide part 132, a light incident part 133, and an inclined part 134.

The guide protrusion can be configured so that the light emitted by the LED 142 can be light-guided.

The guide part 132 has a shape corresponding to an outer circumference of a two-dimensional warning image shape except for a lower surface thereof.

According to the exemplary embodiment of the present disclosure, the guide part 132 is configured in a both-sided shape of a triangular shape except for the lower surface thereof to correspond to the triangular warning image. In other words, the guide part 132 can include a first side portion and a second side portion.

Therefore, it is possible to minimize a portion to which a hot wire is not applied due to a triangular structure matched with a triangular warning image, thereby solving a humidity quality problem that can occur in a side mirror.

The light incident part 133 is disposed in parallel adjacent to the LED 142 upward from the LED 142.

As shown in FIG. 5, the light incident light 133 is disposed at a height lower than a lower end of the guide part 132 with respect to a height of the PCB 141 and formed with a step. Therefore, a hot spot can be formed at the height lower than the lower end of the guide part 132, thereby securing a distance from the guide part 132 region corresponding to the warning image to cover the hot spot.

Furthermore, the light incident part 133 can be formed with a pattern, thereby improving light guide performance. The pattern can be an uneven shape, a dimple shape, etc.

In addition, the pattern can allow the light to be well light-guided up to the edge around the lower end of the guide part 132.

Therefore, the inclined part 134 is connected to the lower end of the guide part 132 from each of both ends of the light incident part 133, and as shown, can be formed of a flat inclined part, and also be formed in a rounded shape.

Therefore, a shape of the lower portion of the guide protrusion can be an inverted trapezoid or arc shape.

An outer circumferential shape of the rear plate 135 also corresponds to the outer circumferential shape of the guide protrusion according to the shape of the guide protrusion, and therefore, the reflector 150 is also provided in a shape corresponding to the shape of the rear plate 135, and inserted between inside surfaces of the top case 130 and the bottom case 120 in a form of covering the guide protrusion and the rear plate 135. In addition, as shown, a seating unit provided to correspond to the form of the reflector 150 and having the reflector 150 inserted therein can be formed inside the bottom case 120.

Furthermore, as shown in FIG. 4, the rear plate 135 is formed with a pattern on the front surface thereof to facilitate the light delivery through the front surface thereof. In addition, a density of the pattern can be different depending upon a distance from the light incident part, and it is more preferable that the pattern is higher in density as it is farther from the light incident part. The pattern can be the uneven shape, the dimple shape, etc., and the high density of the pattern means that the formed pattern is dense, and the low density thereof means that it is coarse.

Lastly, the adhesive tape 160 is formed so that a region with an image displayed is transparent and other regions have a low transmittance to be bonded to the front of the front plate 131 of the top case 130.

Therefore, the warning image is displayed by the light transmitting the transparent region of the adhesive tape 160, and the inclined part 134 is not exposed through the transparent region, so that the hot spot is not exposed to the outside of the warning image.

Hereinafter, the brightness measurement results of the exemplary embodiment, the application example of the exemplary embodiment, the comparative example, and the application example of the comparative example of the present disclosure will be described.

The exemplary embodiment is a case where the pattern is formed on only the light incident part 133, and the application example of the exemplary embodiment is a case where the pattern is formed on the light incident part 133 and the rear plate 135.

Figure 6:
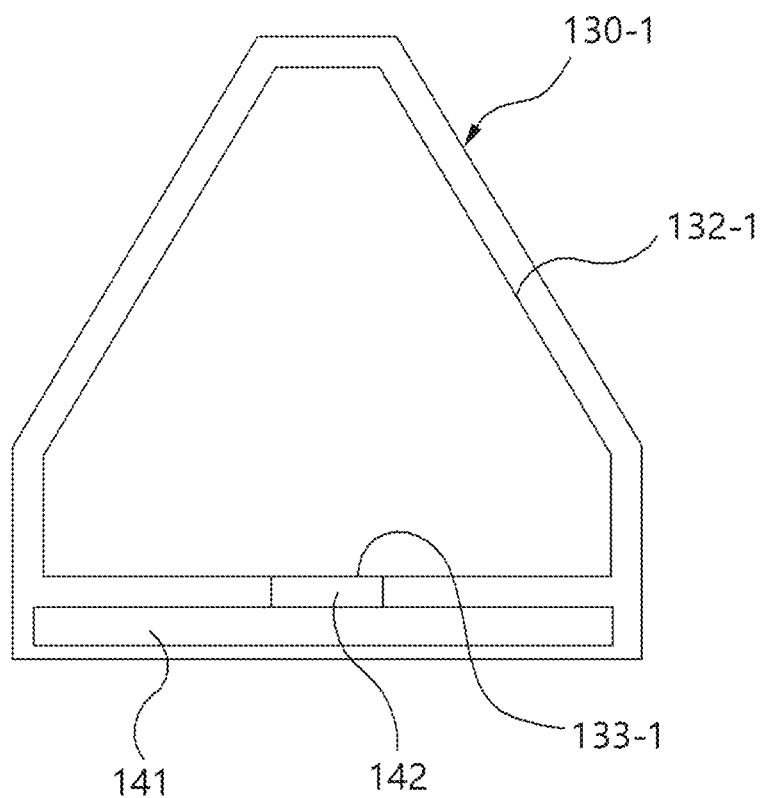
FIG. 6 shows a partial shape of a front surface of a backlight unit for blind spot warning lighting in a first comparative example.

In addition, as shown in FIG. 6, the comparative example is a case of having the form in which the guide part 132-1 of the top case 130-1 can be the same as that of the exemplary embodiment, but only the light incident part 133-1 corresponding to the bottom surface exists and the inclined part does not exist. The application example of the comparative example, is a case where the pattern is formed on the light incident part.

The brightness measurement results are summarized as follows.

TABLE 1

| | Pattern of the light incident part | Pattern of the rear plate | Measured value (30 mA/LED) Brightness by POINT [cd/m$^2$] | |
|---|---|---|---|---|
| Comparative example | X | X | 1 | 1588 |
| | | | 2 | 1042 |
| | | | 3 | 1326 |
| | | | 4 | 3597 |
| | | | AVERAGE | 1888.3 |
| | | | UNI. | 29.0% |
| Application example of the comparative example | 0 | X | 1 | 778 |
| | | | 2 | 1107 |
| | | | 3 | 1180 |
| | | | 4 | 2847 |
| | | | AVERAGE | 1478 |
| | | | INI. | 27.3% |
| Exemplary embodiment | 0 | X | 1 | 620 |
| | | | 2 | 1326 |
| | | | 3 | 1048 |
| | | | 4 | 1537 |
| | | | AVERAGE | 1132.8 |
| | | | UNI. | 40.3% |
| Application example of the exemplary embodiment | 0 | 0, the pattern is denser as it is farther from the light incident part | 1 | 1851 |
| | | | 2 | 2069 |
| | | | 1 | 1805 |
| | | | 4 | 2181 |
| | | | AVERAGE | 1976.5 |
| | | | UNI. | 82.8% |

Where the uniformity (UNI.) refers to a percentage of the minimum value/the maximum value among the measured values.

Figure 7:
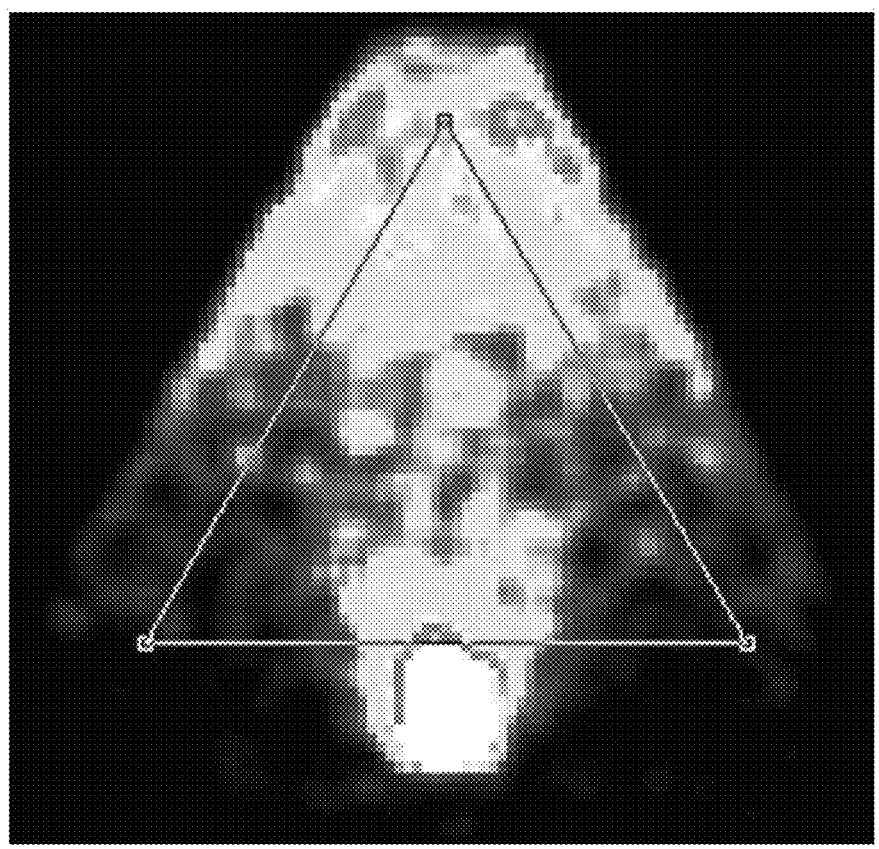
FIG. 7 shows a light quantity measurement result according to the first comparative example of FIG. 6.
Figure 8:
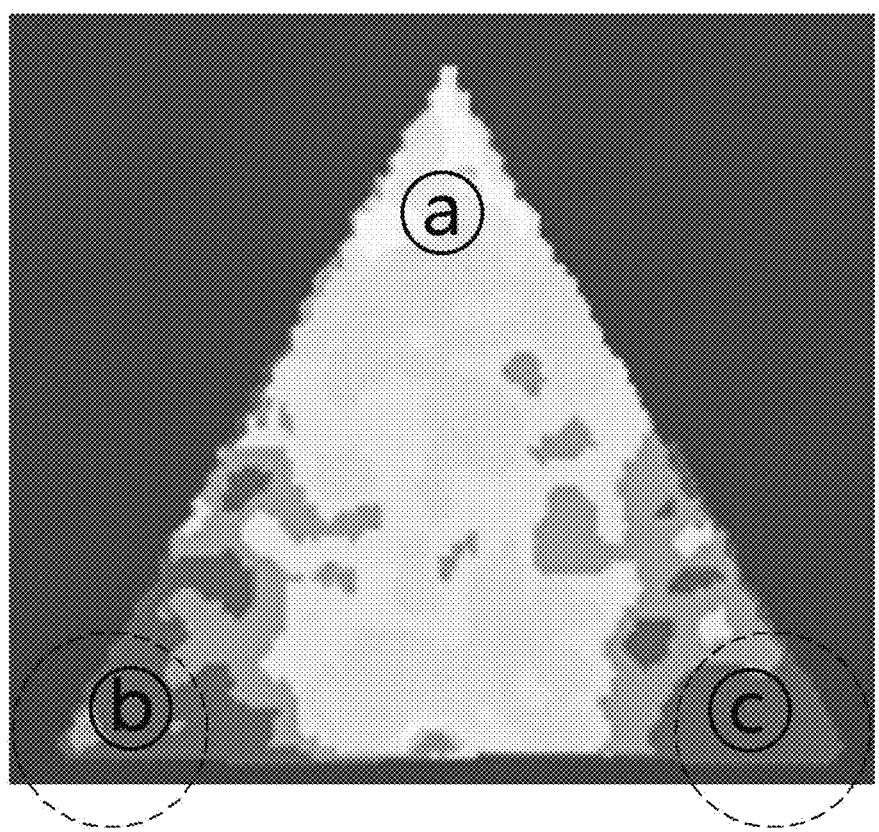
FIG. 8 shows a partial region of FIG. 7.

Referring to FIGS. 7 and 8 that show the result of the comparative example, the light is concentrated on the vertex a of the triangle due to the straightness of the light of the light source, and therefore, other vertices b and c are shaded.

Figure 9:
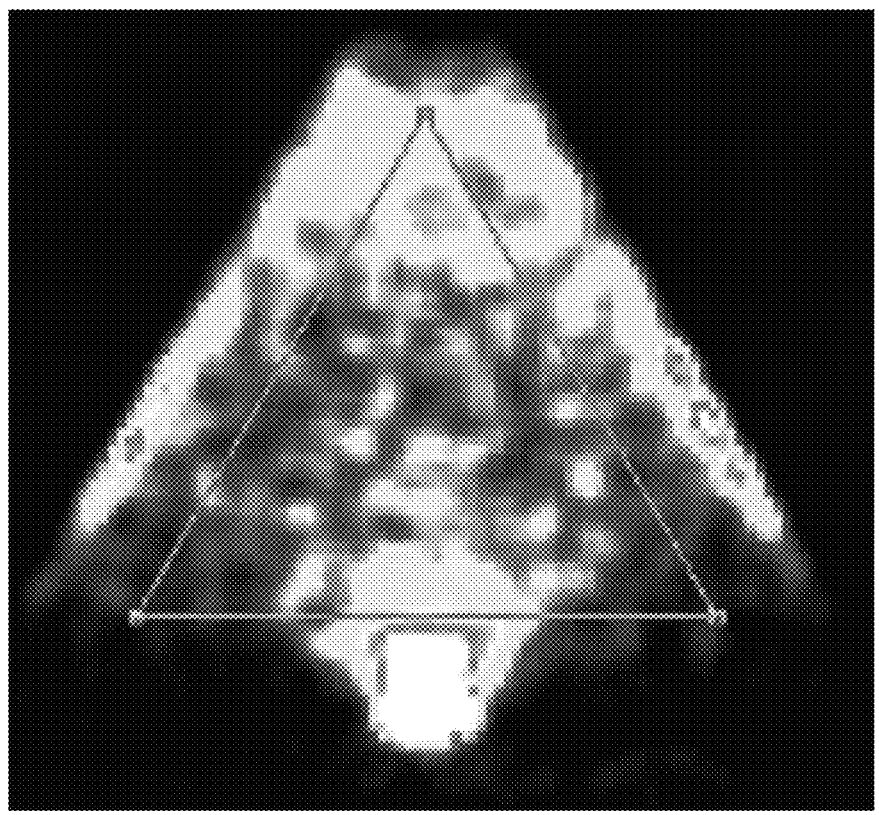
FIG. 9 shows a light quantity measurement result according to an application example of the first comparative example of FIG. 6.
Figure 10:
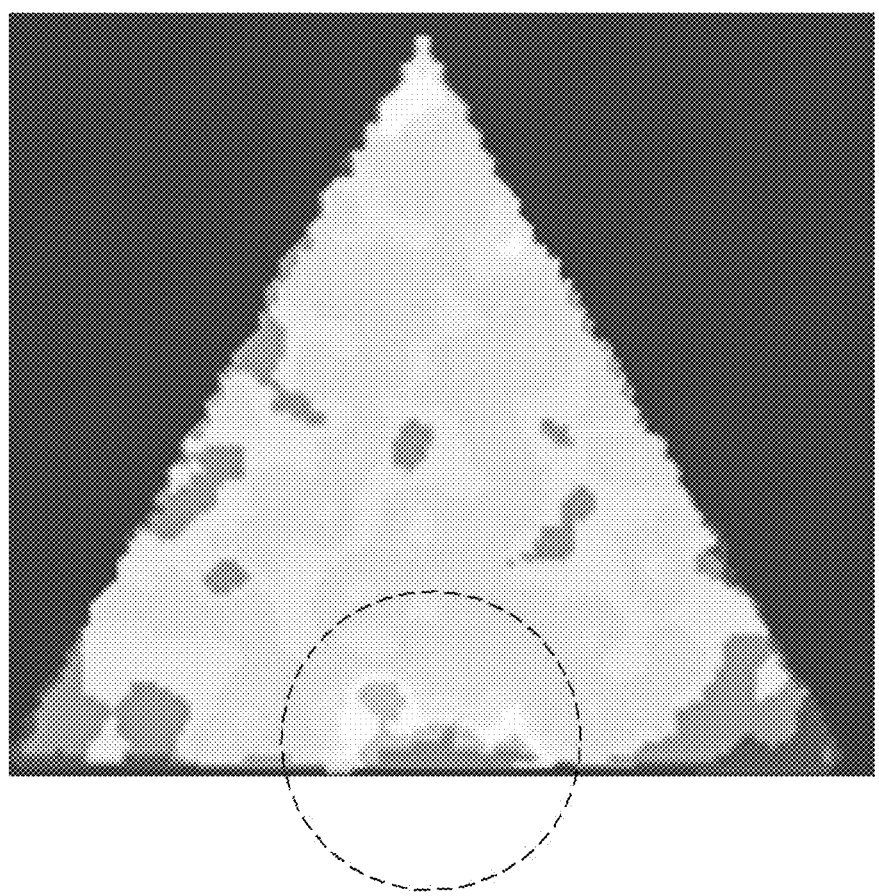
FIG. 10 shows a partial region of FIG. 8.

Referring to FIGS. 9 and 10 that show the result of the application example of the comparative example, the pattern is formed on the light incident part facing the light source so that the light can be delivered up to the vertices b and c of the triangle, but it can be seen that the hot spot is generated on the light source unit.

Figure 11:
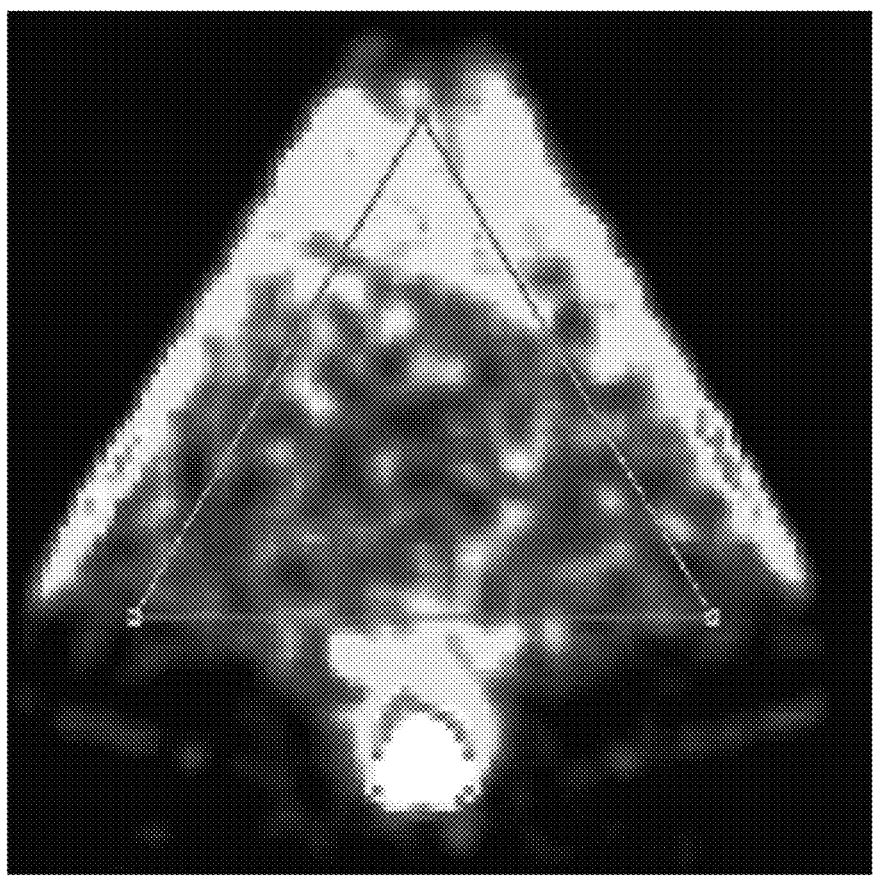
FIG. 11 shows the light quantity measurement result according to the exemplary embodiment of the present disclosure shown in FIG. 5.
Figure 12:
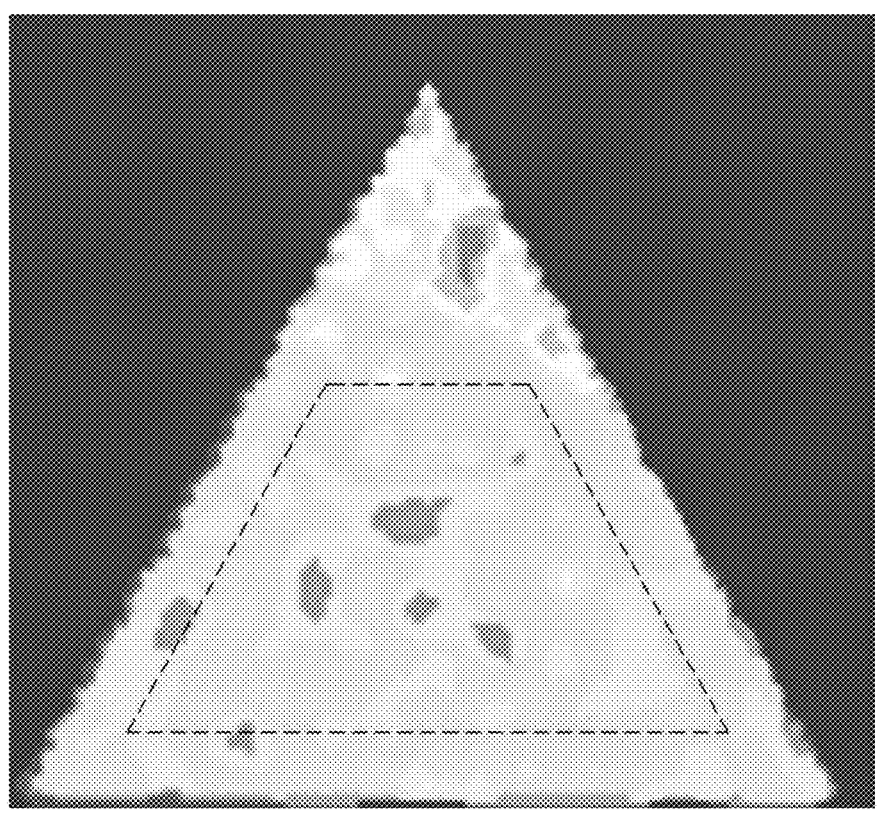
FIG. 12 shows a partial region of FIG. 10.

In addition, referring to FIGS. 11 and 12 according to the exemplary embodiment of the present disclosure, this is a design for additionally securing the distance with the light source to reduce (cover) the hot spot generated in the light source, and at this time, the distance was secured in an inverted trapezoid shape advantageous for minimizing the LOSS area and improving the dark region (so that the light is delivered up to the vertex of the triangular lamp). However, since the LED has the structure in which the light is emitted from the side to use the indirect light, there is a point in which the entire light quantity emitted to the front is smaller than that of the application example of the exemplary embodiment.

Figure 13:
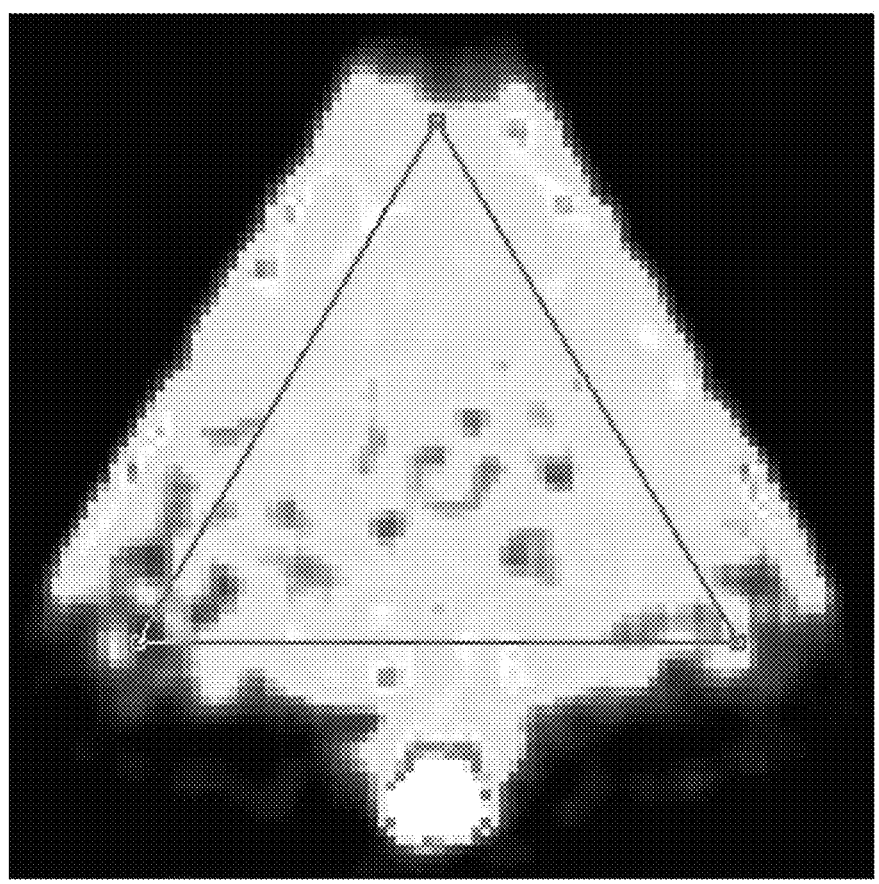
FIG. 13 shows the light quantity measurement result according to a first application example of the exemplary embodiment of the present disclosure shown in FIG. 5.
Figure 14:
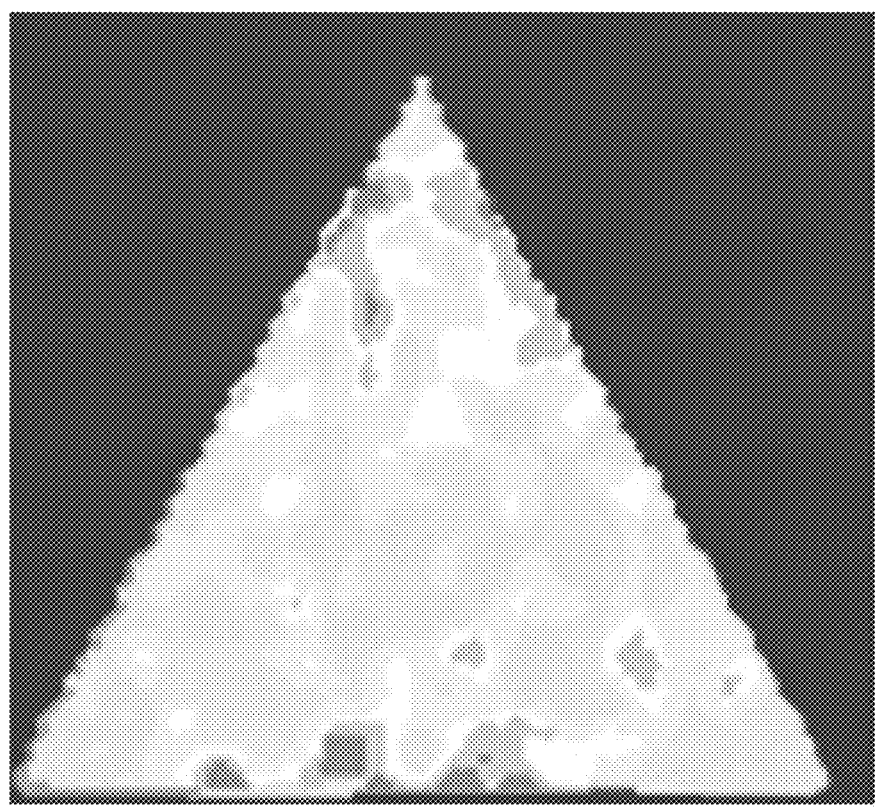
FIG. 14 shows a partial region of FIG. 13.

Referring to FIGS. 13 and 14 according to the application example of the exemplary embodiment of the present disclosure, unlike the related art formed of the multiple layers, it can be seen that the irregular patterns with different densities are formed on the rear surface of the top case so that the top case can serve as the prism plate and the diffusion sheet as well as the light guide plate, thereby increasing the light quantity emitted to the front.

As described above, according to the exemplary embodiment and the application example of the present disclosure, it can be seen that it is possible not to expose the hot spot and to entirely, uniformly distribute the light, and it is advantageous to secure the light quantity and secure the uniformity.

In addition, in case of using the conventional square backlight unit, the region to which the hot wire formed on the side mirror is not applied increases and therefore, humidity can occur on the side mirror, and the shape of the top case according to the present disclosure can prevent the quality from being reduced by not applying the hot wire.

The present disclosure is not limited to the shape of the top case by which the aforementioned functions are implemented, that is, the shapes of the front plate and the guide part, and these shapes can be changed depending upon the shape of the warning image to be used.

Figure 15:
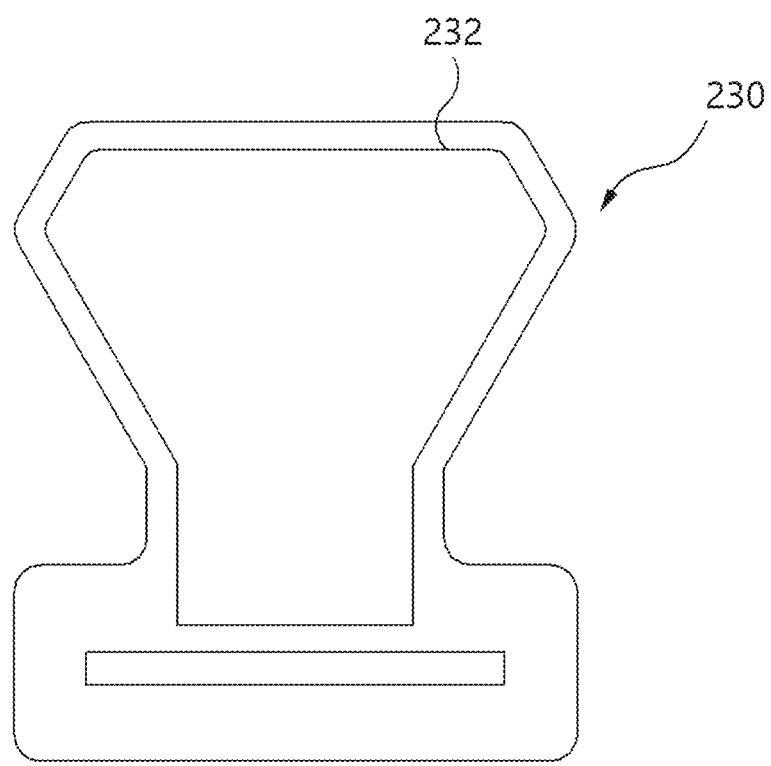
FIGS. 15, 16, and 17 show other application examples of the backlight unit according to the present disclosure.

In other words, the top case can be formed of a top case 230 on which a guide part 232 having approximately an inverted triangular shape shown in FIG. 15 is formed.

Figure 16:
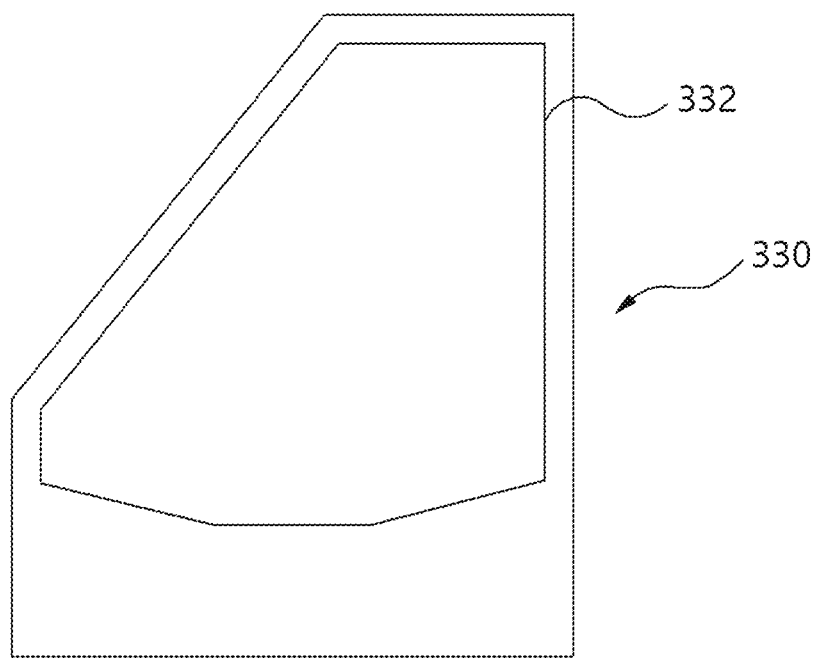

In addition, as shown in FIG. 16, the top case can also be formed of a top case 330 on which a guide part 332 having approximately a right triangle or rectangular shape is formed.

Figure 17:
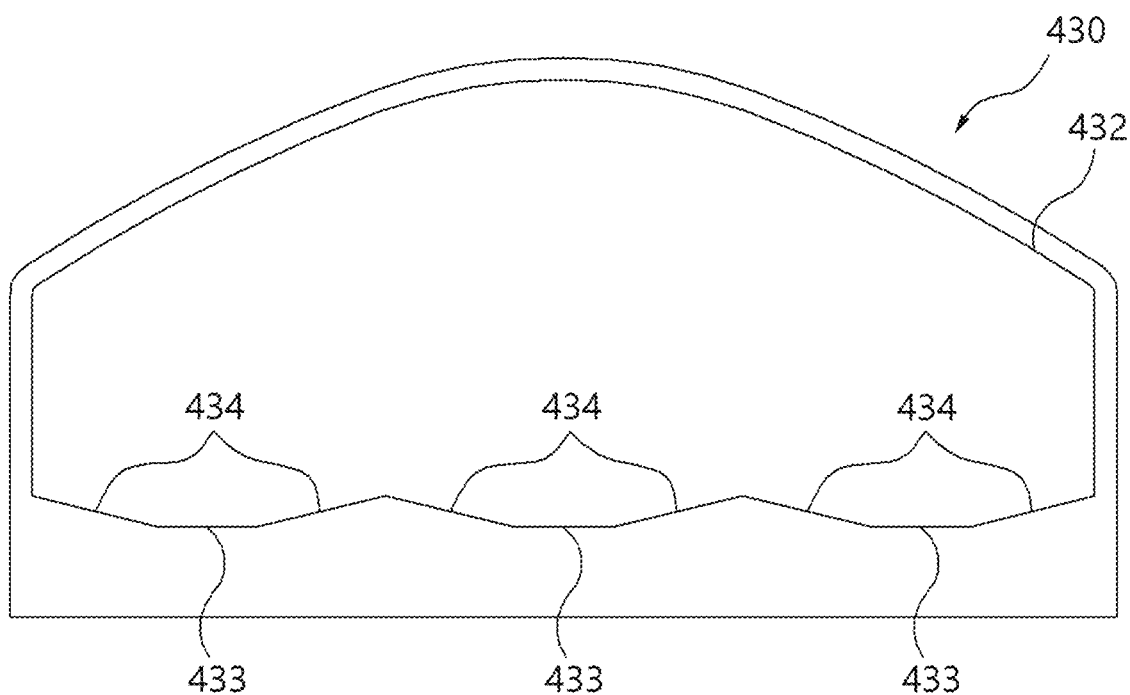

In addition, as shown in FIG. 17, the top case can also be formed of a top case 430 on which a guide part 432 has a shape corresponding to an outer circumference of a warning image shape except for a lower surface thereof, a plurality of light sources and a plurality of light incident parts 433 are disposed to be spaced apart from each other, and an inclined parts 434 are formed between the light incident parts 433.

While the present disclosure has been described above with reference to the exemplified drawings, it is apparent to those skilled in the art that the present disclosure is not limited to the described exemplary embodiments, and can be variously modified and changed without departing from the spirit and scope of the present disclosure. Therefore, the modified examples or the changed examples will be included in the scope of the present disclosure, and the scope of the present disclosure should be construed based on the appended claims.

The invention claimed is:

1. A backlight unit for blind spot warning lighting comprising:
   a printed circuit board (PCB) mounted to a light-emitting diode (LED);
   a bottom case having the PCB embedded on a lower portion thereof, and having an opened front surface; and
   a top case comprising a front plate covering the opened front surface of the bottom case, and a guide protrusion protruding backward from a rear surface of the front plate to guide light from the LED to the front plate.

2. The backlight unit for blind spot warning lighting of claim 1, wherein the guide protrusion comprises:
   a guide part comprising a first side portion and a second side portion for guiding the light from the LED; and
   a light incident part disposed upward from the LED; and
   wherein the light incident part is positioned at a height lower than a height of a lower end of the guide part with respect to a height of the PCB.

3. The backlight unit for blind spot warning lighting of claim 2, wherein the light incident part is formed with a pattern.

4. The backlight unit for blind spot warning lighting of claim 2, wherein the guide protrusion further comprises an inclined part connected from both ends of the light incident part up to both lower ends of the guide part.

5. The backlight unit for blind spot warning lighting of claim 4, wherein the top case further comprises a rear plate having an outer circumferential surface formed along the rear surfaces of the guide part, the light incident part, and the inclined part.

6. The backlight unit for blind spot warning lighting of claim 4, further comprising an adhesive tape bonded to the front surface of the front plate of the top case, the adhesive tape having a plurality of transparent regions on which an image is displayed.

7. The backlight unit for blind spot warning lighting of claim 6, wherein one of the transparent regions of the adhesive tape is positioned at a location higher than the inclined part.

8. The backlight unit for blind spot warning lighting of claim 5, further comprising a reflector covering the guide protrusion and the rear plate, the reflector being inserted between inside surfaces of the top case and the bottom case.

9. The backlight unit for blind spot warning lighting of claim 5, wherein the front surface of the rear plate is formed with a pattern.

10. The backlight unit for blind spot warning lighting of claim 9, wherein a density of the pattern is different depending upon a distance from the light incident part.

11. The backlight unit for blind spot warning lighting of claim 10, wherein the pattern is denser as the distance from the light incident part increases.

12. The backlight unit for blind spot warning lighting of claim 2, wherein a distance between upper ends of the first side portion and the second side portion of the guide part is shorter than a distance between lower ends of the first side portion and the second side portion.

13. The backlight unit for blind spot warning lighting of claim 2, wherein the LED includes a plurality of LEDs, and the guide protrusion comprises a plurality of light incident parts corresponding to the plurality of LEDs.

14. The backlight unit for blind spot warning lighting of claim 13, wherein the guide protrusion further comprises a plurality of inclined parts inclined upward from both ends of each of the plurality of light incident parts.

15. A backlight unit for blind spot warning lighting comprising:
   a printed circuit board (PCB) mounted to a light-emitting diode (LED);
   a bottom case having the PCB embedded on a lower portion thereof, and having an opened front surface; and
   a top case comprising a front plate covering the front surface of the bottom case, a guide protrusion protruding backward from a rear surface of the front plate, and a rear plate having an outer circumferential surface formed along the rear surface of the guide protrusion.

16. The backlight unit for blind spot warning lighting of claim 15, wherein the guide protrusion comprises:
a guide part comprising a first side portion and a second side portion for guiding the light from the LED; and
a light incident part disposed upward from the LED,
wherein the light incident part is positioned at a height lower than a height of a lower end of the guide part with respect to a height of the PCB.

17. The backlight unit for blind spot warning lighting of claim 16, wherein the guide protrusion further comprises an inclined part connected from both ends of the light incident part up to both lower ends of the guide part.

18. The backlight unit for blind spot warning lighting of claim 16, wherein a distance between upper ends of the first side portion and the second side portion of the guide part is shorter than a distance between lower ends of the first side portion and the second side portion.

19. The backlight unit for blind spot warning lighting of claim 16, further comprising an adhesive tape bonded to the front surface of the front plate of the top case, and having a plurality of transparent regions on which an image is displayed.

20. The backlight unit for blind spot warning lighting of claim 16, wherein the light incident part and the rear plate are formed with patterns.

* * * * *